United States Patent
Dauvin et al.

(10) Patent No.: US 10,931,995 B2
(45) Date of Patent: Feb. 23, 2021

(54) METHOD OF TRANSFERRING AUDIOVISUAL DATA AND CORRESPONDING DEVICE

(71) Applicant: INTERDIGITAL CE PATENT HOLDINGS, Paris (FR)

(72) Inventors: Laurent Dauvin, Gévezé (FR); Christophe Jollivet, Vern sur Seiche (FR); Ludovic Havet, Liffré (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 40 days.

(21) Appl. No.: 15/978,172

(22) Filed: May 13, 2018

(65) Prior Publication Data
US 2018/0332331 A1   Nov. 15, 2018

(30) Foreign Application Priority Data

May 15, 2017 (EP) .................................. 17305549

(51) Int. Cl.
*H04N 21/41* (2011.01)
*H04N 21/422* (2011.01)
(Continued)

(52) U.S. Cl.
CPC ....... *H04N 21/4126* (2013.01); *G06F 3/1454* (2013.01); *H04L 12/2805* (2013.01); *H04L 12/4625* (2013.01); *H04L 65/1026* (2013.01); *H04L 67/104* (2013.01); *H04N 21/237* (2013.01); *H04N 21/2541* (2013.01);
(Continued)

(58) Field of Classification Search
CPC ........... H04N 21/4126; H04N 21/4722; H04N 21/422; H04N 21/4367; H04N 21/25816; H04N 21/2541; H04N 21/237; H04N 21/60; H04N 21/41; H04L 65/60; H04L 65/1026; H04L 12/4625; H04L 12/2805; H04L 67/104; H04L 2012/2849; H04L 12/28; H04L 12/18; H04L 67/141; H04L 65/80; G06F 3/1454; G09G 2370/16; G09G 2370/025; G09G 2354/00; G09G 2350/00

See application file for complete search history.

(56) References Cited

U.S. PATENT DOCUMENTS 8,782,269 B2   7/2014 Robin et al.
9,197,696 B1   11/2015 Jakatdar et al.
(Continued)

FOREIGN PATENT DOCUMENTS

GB   2496371   5/2013

*Primary Examiner* — Soe Hlaing
(74) *Attorney, Agent, or Firm* — Volpe Koenig

(57) ABSTRACT

A solution for transferring audiovisual data between devices is provided. A device, for example a guest device, wishes to transfer audiovisual data to a device in a host local network. The guest device connects to a server in a wide area network via the host local network. The guest device selects, via its connection to the server and from a list, provided by the server, of devices in the host local network, a device present in the host local network. The guest device retrieves via the list connection parameters for transferring audiovisual data to the selected device. The guest device connects to the selected device in the host local network using the retrieved connection parameters and transfers audiovisual data to the selected device.

10 Claims, 4 Drawing Sheets

(51) Int. Cl.
  *H04N 21/4722* (2011.01)
  *H04L 29/06* (2006.01)
  *H04N 21/254* (2011.01)
  *G06F 3/14* (2006.01)
  *H04N 21/258* (2011.01)
  *H04N 21/4367* (2011.01)
  *H04L 12/46* (2006.01)
  *H04L 12/28* (2006.01)
  *H04N 21/237* (2011.01)
  *H04L 29/08* (2006.01)

(52) U.S. Cl.
  CPC ..... *H04N 21/25816* (2013.01); *H04N 21/422* (2013.01); *H04N 21/4367* (2013.01); *H04N 21/4722* (2013.01); *G09G 2350/00* (2013.01); *G09G 2354/00* (2013.01); *G09G 2370/025* (2013.01); *G09G 2370/16* (2013.01); *H04L 65/60* (2013.01); *H04L 2012/2849* (2013.01)

(56) References Cited

U.S. PATENT DOCUMENTS

| | | |
|---|---|---|
| 9,436,769 B2 | 9/2016 | Bezek |
| 9,577,979 B1* | 2/2017 | Lepeska ............... H04L 61/1511 |
| 2009/0325642 A1 | 12/2009 | Schuler et al. |
| 2012/0096368 A1 | 4/2012 | McDowell |
| 2012/0210224 A1* | 8/2012 | Wong ............... H04N 21/25891 715/716 |
| 2013/0204962 A1 | 8/2013 | Estevez et al. |
| 2014/0040346 A1* | 2/2014 | Yanagihara ......... H04L 67/2842 709/203 |
| 2014/0331337 A1 | 11/2014 | Factor et al. |
| 2016/0198304 A1 | 7/2016 | Oh et al. |
| 2016/0294942 A1 | 10/2016 | Tembey et al. |
| 2018/0097856 A1* | 4/2018 | Dange ................. H04L 12/1818 |

* cited by examiner

METHOD OF TRANSFERRING AUDIOVISUAL DATA AND CORRESPONDING DEVICE

REFERENCE TO RELATED EUROPEAN APPLICATION

This application claims priority from European Patent Application No. 17305549.2, entitled "METHOD OF TRANSFERRING AUDIOVISUAL DATA AND CORRESPONDING DEVICE", filed on May 15, 2017, the contents of which are hereby incorporated by reference in its entirety.

FIELD

The present disclosure generally relates to the field of transfer of audiovisual data and in particular to transfer of audiovisual data between devices connected in a local network.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Audiovisual content is typically shared between devices using cloud-based storage. Cloud-based storage, though having many commonly admitted advantages, also raises some further considerations. Privacy considerations and access delays, for example due to limited network (upload) bandwidth are some of those concerns. Direct data transfer between devices in a local network is offers fast access but is challenging for security concerns.

There is thus a need for a solution to data sharing between devices in a local network which offers data privacy, security, and low access delay.

SUMMARY

According to one aspect of the present disclosure, a method of transferring audiovisual data between devices, is provided. The method comprises accessing, by the device in the local network, to a list, provided by a server in a wide area network, of devices in the local network. The method further comprises retrieving, by the device in the local network and via the list, connection parameters for connecting, via the local network, the device in the local network to the another device in the local network. The method further comprises connecting, by the device in the local network, the device in the local network to the another device in the local network, using the retrieved connection parameters. Finally, the method further comprises transferring, by the device in the local network and via the connection to the another device in the local network, audiovisual data between the device in the local network and the another device in the local network.

According to an embodiment of the method of transferring audiovisual data between devices in a local network, the method further comprises receiving, by the device, an Internet Protocol address for use in the local network and transmitting, to the server, the Internet Protocol address, for determining by the server devices in the local network based on the Internet Protocol address.

According to an embodiment of the method of transferring audiovisual data between devices in a local network, the Internet Protocol address transmitted to the server is the Internet Protocol address for use in the local network as translated by a Network Address Translator in between the local network and the server.

According to an embodiment of the method of transferring audiovisual data between devices in a local network, the method further comprises transmitting, to the server, an identification number of a gateway in the local network for determining by the server devices in the local network based on the identification number of the gateway.

According to an embodiment of the method of transferring audiovisual data between devices in a local network, the method further comprises transmitting, to the server, an identification number of the local network for determining by the server devices in the local network based on the identification number of the local network.

According to an embodiment of the method of transferring audiovisual data between devices in a local network, the connection parameters comprise authorization data enabling access by the device to data storage in the selected device in the local network for receiving audiovisual data from the device in the local network.

According to an embodiment, the server is a Service Provider server, and the list of devices in said local network provided by the server corresponds to subscriber devices of the Service Provider and in the local network.

According to one aspect of the present disclosure, a device for transferring audiovisual data between devices, is provided for. The device comprising a processor, a network interface and a memory configured to; to access, to a list, provided by a server in a wide area network, of devices in the local network; to retrieve from the server and via the list, connection parameters for connecting, via the local network, the device in the local network to another subscriber device in the local network, selected from the list; to connect to the another device in the local network, using the retrieved connection parameters; and to transfer via the connection to the another device in the local network, audiovisual data between the device and the another device in the local network.

According to an embodiment of the device, the processor, the network interface and the memory are further configured to receive an Internet Protocol address for use in the local network and to transmit to the server, the Internet Protocol address, for determining by the server devices in the local network based on the Internet Protocol address.

According to an embodiment of the device, the processor, the network interface and the memory are further configured to transmit, to the server, an identification number of a gateway in the local network for determining by the server devices in the local network based on the identification number of the gateway.

According to an embodiment of the device, the processor, the network interface and the memory are further configured to transmit, to the server, an identification number of the local network for determining by the server devices in the local network based on the identification number of the local network.

According to a further embodiment of the device, the server is a Service Provider server, and the list of devices in said local network provided by the server corresponds to subscriber devices of the Service Provider and in the local network.

BRIEF DESCRIPTION OF THE DRAWINGS

More advantages of the present disclosure will appear through the description of particular, non-restricting embodiments. In order to describe the manner in which the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure. The embodiments will be described with reference to the following drawings in which.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
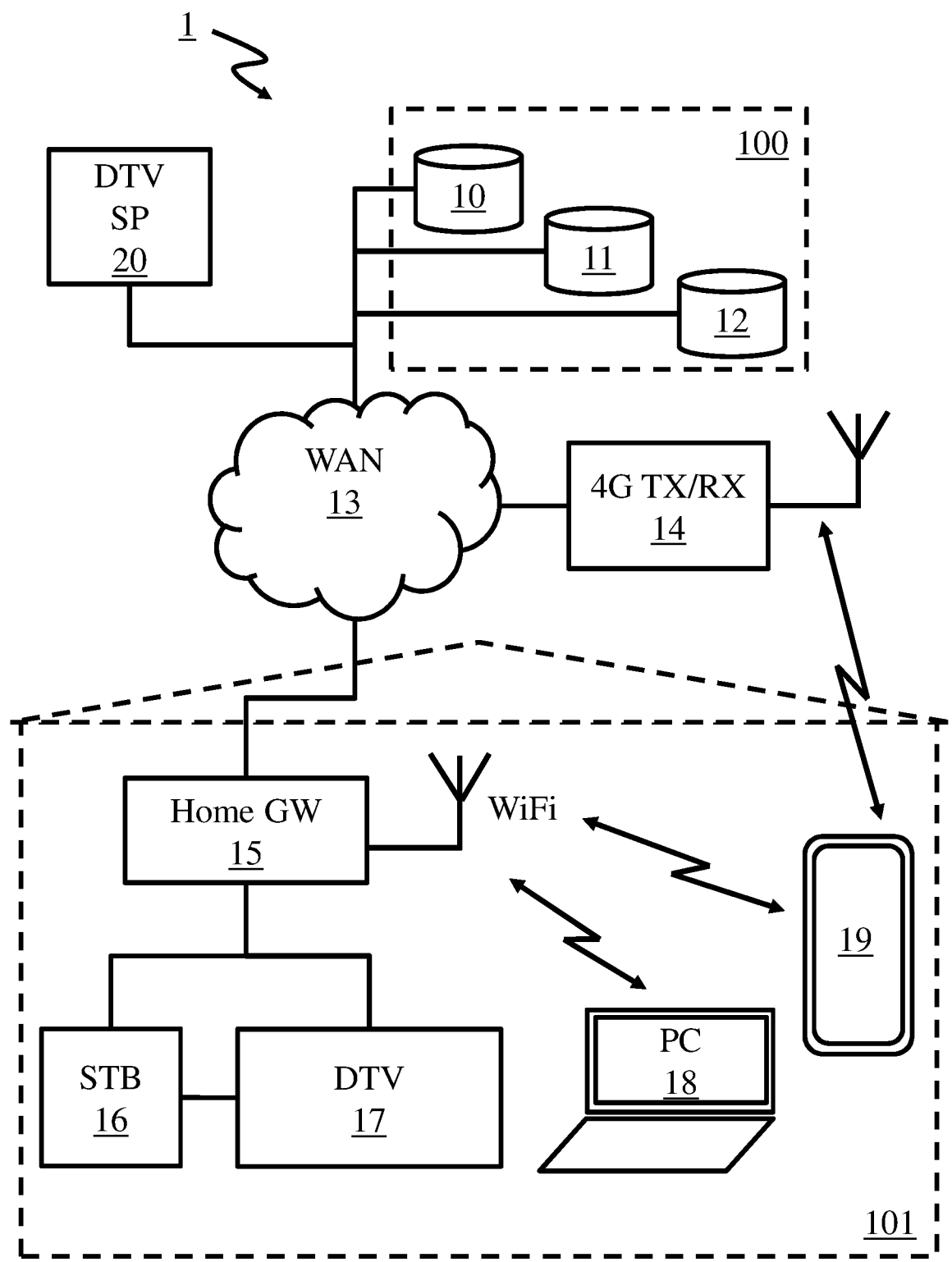
FIG. 1 is a system for sharing audiovisual data between devices.

FIG. 1 is a system for sharing audiovisual data between devices. A system 1 includes a Home Network Gateway (HNG) 15, providing a Local Area Network (LAN) in consumer premises 101 that includes gateway 15, Set Top Box (STB) 16, Digital Television (DTV) 17, and Personal Computer (PC) 18. HNG 15 is connected to Wide Area Network (WAN) 13, which provides the devices in the local area network with access to the Internet. STB 16 is connected to a digital television service provider 20 (DTV-SP). Digital television 17 receives digital television content from STB 16 via a High Definition Multimedia Interface (HDMI). DTV 17 has further access to the home network and optionally to the Internet via a connection to the WAN 13. Also connected to the WAN is cloud storage server 100 that includes an array of storage devices 10-12. Mobile access to the WAN for a mobile device (smartphone) 19 is enabled via a fourth-generation (4G) mobile transmission/reception network server 14 attached to the WAN 13. Sharing of content between devices in the home environment is enabled through the connection to the WAN via cloud storage server 100, and through their connection to the LAN via Ethernet or WiFi; the home network devices may have installed Digital Living Network Alliance (DLNA) server/client software for sharing data between home network devices. Sharing of content between two devices in the home network is enabled through device-to-device wireless connections Bluetooth (BT), Near Field Communication (NFC) or device to device wired connections via Universal Serial Bus (USB).

A user of a local device connected in the home network can upload audiovisual data that they wish to share with other devices in the home network via the cloud storage. The user then uploads the audiovisual data (e.g. images, files) to share from a source local device to a cloud storage, and then downloads the audiovisual data from the cloud storage to a destination device. This process is cumbersome as it requires an experienced user who needs to execute several user actions, such as subscribing to a cloud storage service (i.e., Dropbox, Onedrive, . . . ), uploading from one device, connecting the destination device to the cloud storage service using the cloud storage subscriber ID, selecting the audiovisual data and downloading the audiovisual data. This process is slow since the same audiovisual data is transferred twice over the Internet. Further, a consumer may not wish to upload the audiovisual content to share with another device in the home network for privacy reasons. Login passwords for accessing the cloud data storage can be stolen, for example. The cloud-based solution thus raises some privacy considerations and access delays.

Alternatively, the user of a local device connected in the home network can share audiovisual data between the local device and other devices connected in the home network via direct connection, e.g. via NFC or USB. The access to the destination device requires the user to configure access to the destination device and to enter one or more login/passwords for data export from the source device to data import on the destination device. In addition, while many devices incorporate WiFi or BT wireless network interfaces, many devices still do not include NFC. NFC was designed for very short distance communication such as for contactless payment and offers very low bandwidth compared to other wireless technologies. It is therefore not suited for transmission of voluminous data. USB is for wired data communication only.

Alternatively, the user of a local device connected to the home network can share audiovisual data between the local device and other devices in the home network using DLNA. It can be used over wired or wireless connections. However, the setting up of the DLNA network requires network configuration setup by an adverted user and is therefore far from intuitive.

Figure 2:
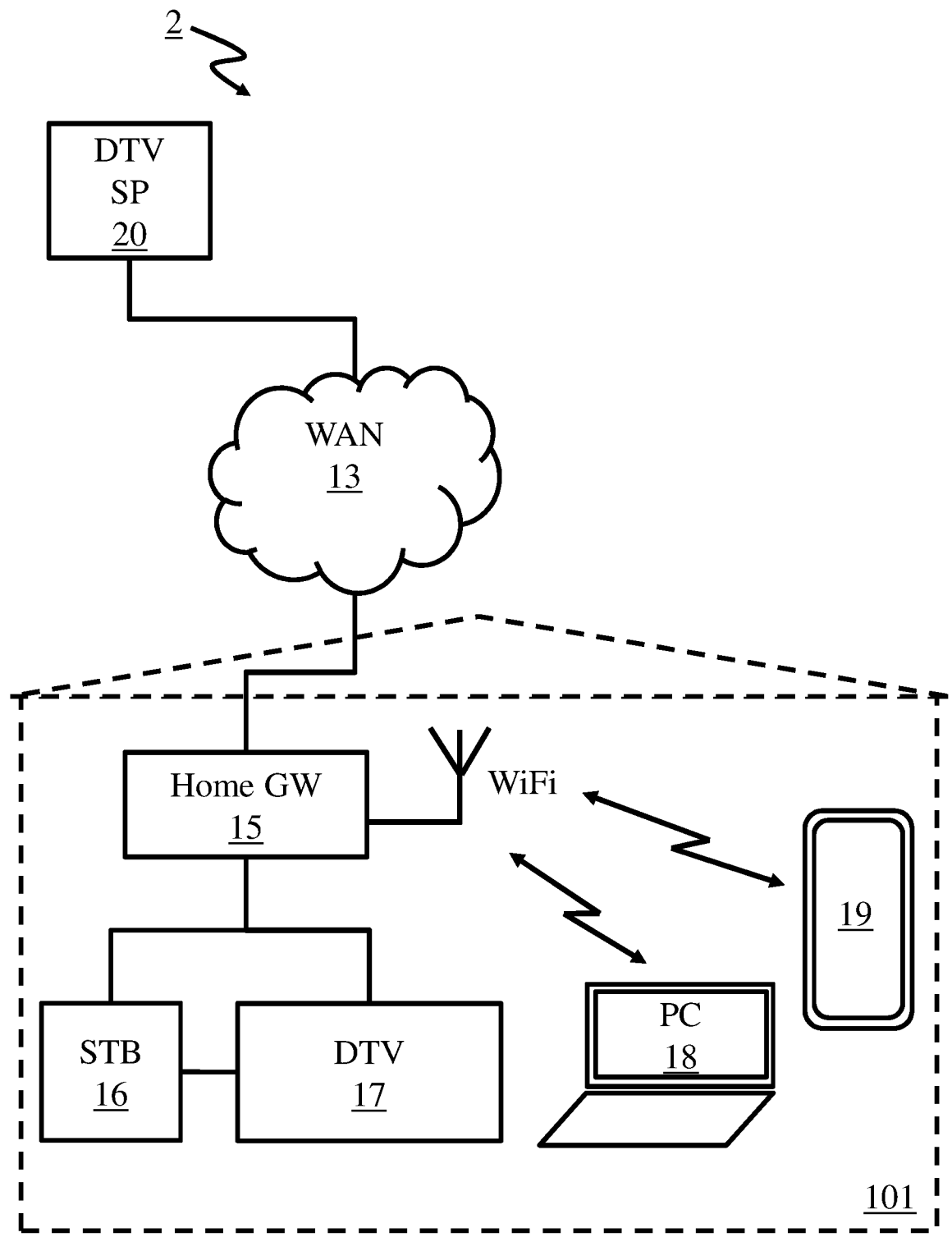
FIG. 2 is a system for sharing audiovisual data between devices in a local network according to an embodiment of the present principles.

FIG. 2 is a system 2 for sharing audiovisual data between devices in a local network according to an embodiment of the present principles, which does not require a cloud storage, nor a direct connection to an external network. With reference to FIG. 1, devices 100 (cloud storage server) and 14 (4G network server) are thus omitted from the system depicted in FIG. 2.

Figure 3:
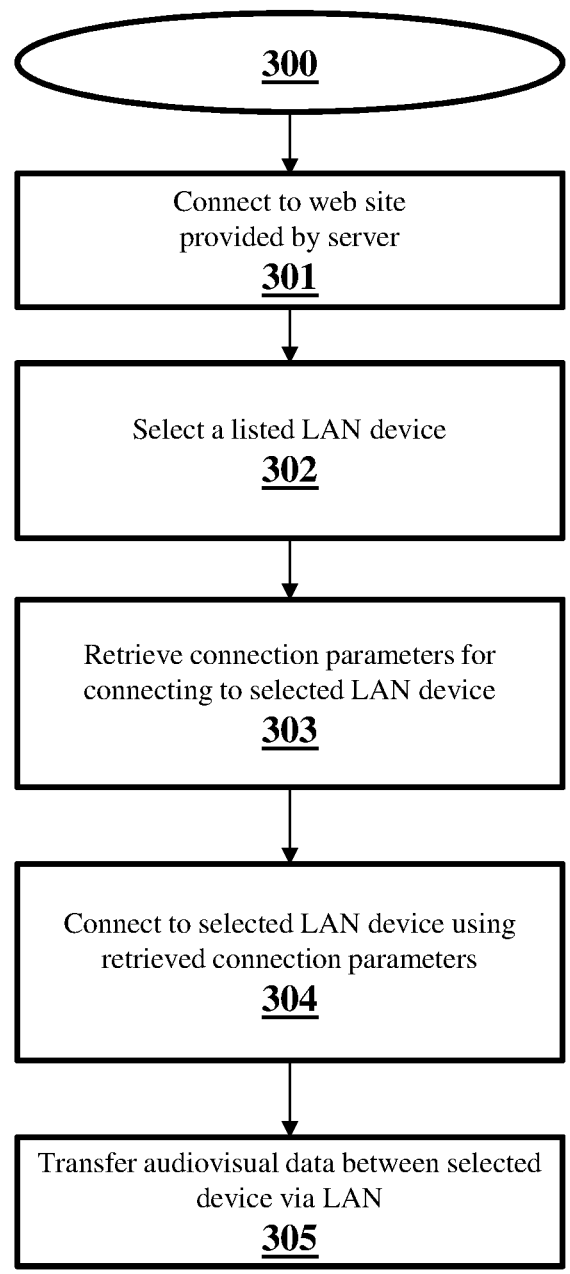
FIG. 3 is a flow chart of an embodiment of a method according to the present principles.

FIG. 3 is a flow chart of an embodiment of a method 300 according to principles of the present disclosure. Using the access to the WAN, e.g., as provided by HNG 15, a LAN device 19 connects in step 301 to a server, e.g. to server DTV-SP 20. LAN device 19 is for example a guest device, such as a mobile device, that connects to the LAN (host network or host local network) via a WiFi network provided by HNG 15. DTV-SP 20 provides digital television services to at least one device in the LAN (e.g., to a subscriber device of DTV-SP 20), for example, to HNG 15, to STB 16 and to PC 17. Following its connection to the server, e.g. to DTV-SP 20, LAN device 19 receives, for example, a web page from the server (e.g. from DTV-SP 20). This web page lists one or more devices in the LAN which are known to the server (e.g., to DTV-SP 20) as being devices in the LAN, e.g., that are subscribers to a service offer provided by DTV-SP 20. In step 302, LAN device 19 selects one of the listed devices as a destination device for transferring audiovisual data stored on LAN device 19, for example STB 16, PC 18, or HNG 15. Following this, in step 303, LAN device 19 retrieves from the server, e.g. from DTV-SP 20, connection parameters for connecting to the selected device via the local network. In step 304, LAN device 19 connects, via the LAN, to the selected device, using the connection parameters previously retrieved. Finally, in step 305 LAN device 19 transfers audiovisual data via the LAN to the selected device, e.g., to STB 16 for display on DTV 17, to STB 16, PC 18 or HNG 15 for storing. The audiovisual data transferred is for example, image or video. The data transfer is for example file transfer or streaming.

According to a particular embodiment, LAN device 19 receives an Internet Protocol address when in the process of connecting to the LAN. This IP address is then communicated to the server, e.g., to DTV-SP 20 in step 301 e.g., the server, e.g. DTV-SP 20 can read the source IP address in the IP data communication packet when the device 19 connects to the server for receiving the web-page. The server then 'knows', e.g., from searching IP address correspondence in a database, any devices, e.g. subscriber devices of DTV-SP 20, in the LAN of device 19 based on the source address as present in the IP packet transmitted to the server when the device 19 connects to the server's web server. According to a particular embodiment, the source address in the IP data communication packet transmitted to the server is the public IP address of HNG 15 as provided by a Network Address Translation (NAT) function, e.g., a NAT in HNG 15, when device 19 connects to the server's web server via HNG 15.

According to a particular embodiment, during connection of device 19 to the server and part of step 301, an identification number is transmitted to the server. Based on this identification number the server searches in a database and retrieves a list of known devices (e.g., subscriber devices) in the local network identified by the identification number. This identification number is for example an identification number of HNG 15, e.g., a serial number, or an identification number of the local network, for example a WiFi network identifier or WiFi access key for accessing the WiFi network. The particular embodiment of transmitting the IP source address (NAT translated or not) can be combined with any of the particular embodiments of transmitting an identification number. The transmitted information may be protected through application, before or during transmission, of any known data protection method.

According to a particular embodiment, the identification number is previously received by device 19 when it connects to the local network, or manually entered by the user of device 19.

In a particular embodiment, the connection parameters received by device 19 in step 303 includes network device identification data such as IP address of the selected device, Media Access Control (MAC) address, or any other device identifier of the selected device and further includes authorization (login) data that enables access by the device 19 to the selected local network device. The authorization data includes, for example, an ad hoc generated single-use and limited time-validity access identifier or access key. The connection parameters as received in step 303 may be protected against tampering through application of any known data protection method.

According to a particular embodiment, the server precedes the transmission of connection parameters to the device 19 in step 303 by a transmission of a message (access authorization request) to the selected local network device, requesting the selected device or its registered user (or registered subscriber) to authorize access by the device 19. This message is for example, a question which has to be answered by the registered user/subscriber or a code that is to be entered by the user/subscriber and that is normally only known to the user/subscriber, in the form of a popup message e.g., to be displayed on DTV 17, or in the form of a Short Message Service (SMS) message transmitted to a registered telephone number of the user/subscriber requesting approval of the user/subscriber for giving device 19 access to the selected device. The server, e.g. DTV-SP 20 can find the user/subscriber's telephone number in a database using the source IP address for searching in the database as mentioned previously.

According to a particular embodiment, the server, e.g. DTV-SP 20, stores identifier of the device 19 in a database for later use, so that, once device 19 is authorized to access the selected local network device, it is not further required for the user/subscriber to give an explicit authorization to device 19 for accessing the selected local network device, if the authorization is already recorded in the database.

In a particular embodiment, the method comprises a step of transfer and installation of an application on device 19. This application is for example proposed when device 19 connects to the local network for the first time. The application, for example an Android application (Android App) or iOS application (iOS app) implements at least some of the steps of the method.

Figure 4:
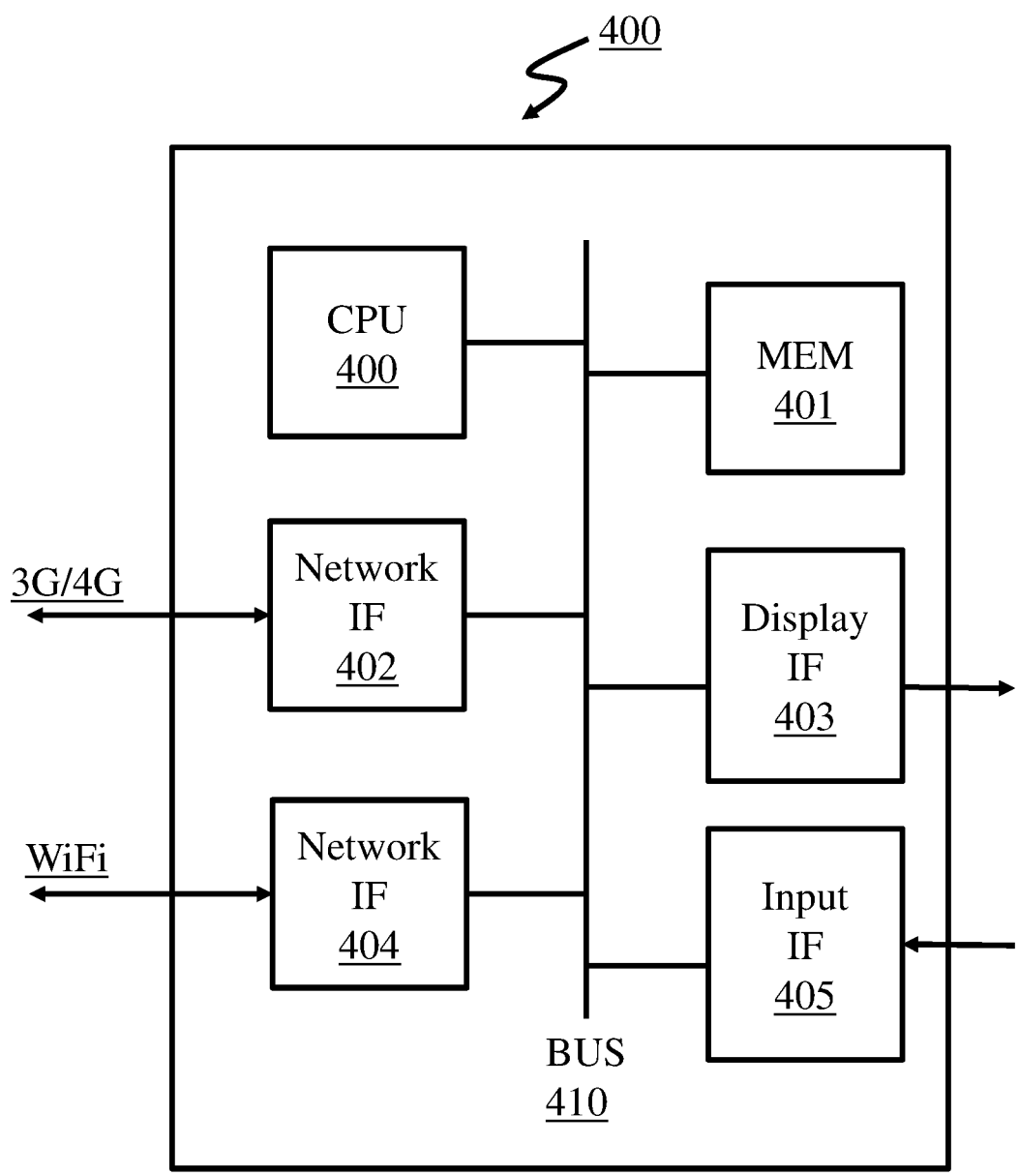
FIG. 4 is an embodiment of a device for implementing the method of according to the present principles.

FIG. 4 is an embodiment of a device 400 for implementing the method of transferring audiovisual data between devices and any of the previously discussed particular embodiments of the method. Device 400 is for example a smartphone, a tablet, or a PC. The device includes a Central Processing Unit (CPU) or processor 400, a memory 401, a first network interface 402, a second network interface 404, a display interface 403 and an input interface 405, interconnected via an internal communication bus 410. The first network interface 402 is for example of the 3G/4G type for outdoor communication. The second network interface 403 is for example of the WiFi type for indoor communication. The display interface 403 and input interface 405 are for example combined in a single touch-screen device. Processor 400, network interface 404 and memory 401 are configured to connect, via a local network such as a WiFi network, the device to a server, e.g. to DTV-SP 20 in a wide area network 13 providing services to at least one device in the local network. Processor 400, network interface 404 and memory 401 are further configured to select, from a list of devices in the local network provided by the server e.g. by DTV-SP 20, another device in the local network. Such selection is for example done by input interface 405, or automatically, per configuration information stored in memory 401. Processor 400, network interface 404 and memory 401 are further configured to receive from the server, e.g. from DTV-SP 20, connection parameters for connecting, via the local network, device 400 to the selected device in the local network and for transferring via the local network, audiovisual data from device 400 in said local network to the selected local network device in the local network; Processor 400, network interface 404 and memory 401 are further configured to connect to the selected device in the local network, using the received connection parameters; and Processor 400, network interface 404 and memory 401 are further configured to transfer via the connection to the selected device in the local network, audiovisual data to the selected device in the local network.

It can thus be observed that the principles of the present disclosure enable easy connection by a device and data transfer from the device to a local network device, without requiring complicated configuration and network login for the device. The principles are typically suitable for mobile guest devices connecting to the local network and wishing to transfer content to another device in the local network. As a typical example, a guest arriving in a home may have a smartphone with photos and videos of his latest holiday trip that the guest wants to show to her/his hosts on a wall-mounted digital television in the living room.

It may be appreciated that some elements in the drawings may not be used or be necessary in all embodiments. Some operations may be executed in parallel. Different embodiments other than those illustrated and/or described are possible. For example, a device implementing the principles of the present disclosure may include a mix of hard- and software.

It may be appreciated that aspects of the principles of the present disclosure can be embodied as a system, method or computer readable medium. Accordingly, aspects of the principles can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the principles can take the form of a computer readable storage medium. Any combination of one or more computer readable storage medium(s) can be utilized.

Thus, for example, it may be appreciated that the diagrams presented herein represent conceptual views of illustrative system components and/or circuitry embodying the principles of the present disclosure. Similarly, it may be appreciated that any flow charts, flow diagrams, state transition diagrams, pseudo code, and the like represent various processes which may be substantially represented in computer readable storage media and so executed by a computer or processor, whether or not such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method of transferring audiovisual data between local network devices in a local network wherein said local network devices include a gateway providing a wireless local network for a local network device in said local network, the method being implemented by a guest local network device in said local network:
    transmitting, by said guest local network device, a wireless network access key to a server of a service provider in a wide area network, said server providing services to said gateway;
    receiving, by said guest local network device, from the server, based on said wireless network access key, list of local network devices in said local network that are subscribers to a service offer of said service provider;
    retrieving, by said guest local network device, from said list, connection parameters for connecting, via said wireless local network, said guest local network device in said local network to a second local network device in said local network, selected from said list by said guest local network device;
    connecting, by said guest local network device, said guest local network device to said second local network device, using said retrieved connection parameters;
    transferring, by said guest local network device and via said connection to said second local network device, audiovisual data stored in said guest local network device to said second local network device.

2. The method according to claim 1, further comprising receiving, by the guest local network device, an Internet Protocol address for use in the local network and transmitting, by the guest local network device to the server, the Internet Protocol address, for determining, by the server, local network devices in the local network that are subscribers to the service offer of the service provider, based on the Internet Protocol address.

3. The method according to claim 2, wherein the Internet Protocol address transmitted by the guest local network device to the server is the Internet Protocol address for use in the local network as translated by a Network Address Translator in between the local network and the server.

4. The method according to claim 1, further comprising transmitting, by the guest local network device to the server, an identification number of the gateway in the local network for determining, by the server, local network devices in the local network that are subscribers to the service offer of the service provider, based on the identification number of the gateway.

5. The method according to claim 1, further comprising transmitting, by the guest local network device to the server, an identification number of the local network for determining, by the server, local network devices in the local network that are subscribers to the service offer of the Service Provider, based on the identification number of the local network.

6. The method according to claim 1, wherein the connection parameters comprise authorization data enabling access by the guest local network device to data storage in the second local network device for receiving audiovisual data from the guest local network device.

7. A local network device for transferring audiovisual data between local network devices in a local network including a gateway providing a wireless local network for the local network device in the local network, the local network device comprising a processor, a network interface and a memory configured to:
- transmit a wireless network access key to a server of a service provider in a wide area network, the server providing services to the gateway;
- receive, from the server, based on the wireless network access key, a list of local network devices in the local network that are subscribers to a service offer of the service provider;
- retrieve, from the list, connection parameters for connecting, via the wireless local network, the local network device in the local network to another local network device in the local network, selected from the list;
- connect to the another local network device in the local network, using the retrieved connection parameters; and
- transfer via the connection to the another local network device in the local network, audiovisual data stored in the local network device to the another local network device in the local network.

8. The local network device according to claim 7, wherein the processor, the network interface and the memory are further configured to receive an Internet Protocol address for use in the local network and to transmit to the server, the Internet Protocol address, for determining, by the server, local network devices in the local network that are subscribers to the service offer of the service provider, based on the Internet Protocol address.

9. The local network device according to claim 7, wherein the processor, the network interface and the memory are further configured to transmit, to the server, an identification number of the gateway in the local network for determining, by the server, local network devices in the local network that are subscribers to the service offer of the service provider, based on the identification number of the gateway.

10. The local network device according to claim 7, wherein the processor, the network interface and the memory are further configured to transmit, to the server, an identification number of the local network for determining, by the server, local network devices in the local network that are subscribers to the service offer of the service provider, based on the identification number of the local network.

* * * * *